(12) United States Patent
Nakase et al.

(10) Patent No.: US 6,279,546 B1
(45) Date of Patent: Aug. 28, 2001

(54) WATERCRAFT FUEL SUPPLY SYSTEM

(75) Inventors: Ryoichi Nakase; Naoki Katoh; Shigeyuki Ozawa; Masayoshi Nanami, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/777,486

(22) Filed: Dec. 30, 1996

(30) Foreign Application Priority Data

Dec. 28, 1995 (JP) .................................................. 7-343978

(51) Int. Cl.$^7$ .................................................. F02M 37/04
(52) U.S. Cl. .......................... 123/516; 123/509; 440/88
(58) Field of Search .................................. 123/516, 509, 123/456, 198 D, 510, 518, 519, 520; 440/88, 84, 111

(56) References Cited

U.S. PATENT DOCUMENTS

| | | |
|---|---|---|
| 4,982,682 | 1/1991 | Hattori . |
| 5,056,494 * | 10/1991 | Kayanuma ........................ 123/516 |
| 5,103,793 | 4/1992 | Riese et al. . |
| 5,146,901 | 9/1992 | Jones . |
| 5,309,885 | 5/1994 | Rawlings et al. . |
| 5,363,827 | 11/1994 | Siekmann . |
| 5,368,001 | 11/1994 | Roche . |
| 5,375,578 | 12/1994 | Kato et al. . |
| 5,389,245 | 2/1995 | Jaeger et al. . |
| 5,390,621 | 2/1995 | Hattori et al. . |
| 5,404,858 | 4/1995 | Kato . |
| 5,482,021 | 1/1996 | Roche . |
| 5,558,549 | 9/1996 | Nakase et al. . |
| 5,562,509 | 10/1996 | Nakase et al. . |
| 5,632,660 | 5/1997 | Nakase et al. . |
| 5,655,500 * | 8/1997 | Kato ..................................... 123/336 |
| 5,669,358 * | 9/1997 | Osakabe .............................. 123/509 |
| 5,704,334 * | 1/1998 | Kato ..................................... 123/456 |
| 5,724,936 * | 3/1998 | Osakabe ........................... 123/198 R |
| 5,762,040 * | 6/1998 | Taipale ................................ 123/299 |
| 5,797,378 * | 8/1998 | Kato ..................................... 123/516 |
| 5,803,044 * | 9/1998 | Kato ..................................... 123/336 |
| 5,803,050 * | 9/1998 | Osakabe .............................. 123/456 |
| 5,819,711 * | 10/1998 | Motose ................................ 123/509 |
| 5,855,197 * | 1/1999 | Kato ..................................... 123/516 |
| 5,902,158 | 5/1999 | Nakase et al. . |

* cited by examiner

Primary Examiner—Carl S. Miller
(74) Attorney, Agent, or Firm—Knobbe, Martens, Olson & Bear, LLP

(57) ABSTRACT

An improved fuel delivery and injection system for a small watercraft engine reduces the heat effects within an enclosed engine compartment upon a fuel pump of and the fuel within a fuel injection system. The fuel delivery system includes a vapor separator and a high-pressure fuel pump. The fuel pump is at least partially located within the vapor separator. The fuel within the vapor separator cools the fuel pump. The vapor separator also is positioned between a pair of air ducts such that an air stream between the ducts cools the fuel within the vapor separator. This arrangement consequently improves the consistency of the air/fuel ratio in the fuel charges delivered to the engine cylinders, provides a compact structure between the fuel pump, and the vapor separator and improves the durability of the fuel pump.

40 Claims, 7 Drawing Sheets

WATERCRAFT FUEL SUPPLY SYSTEM

BACKGROUND OF THE INVENTION

1. Field of the Invention

The present invention relates in general to an engine of a small watercraft, and in particular to a fuel supply system for a watercraft engine.

2. Description of Related Art

Personal watercrafts have become popular in recent years. This type of watercraft is sporting in nature; it turns swiftly, is easily maneuverable, and accelerates quickly. Personal watercraft today commonly carrier one rider and one or two passengers.

A relatively small hull of the personal watercraft defines an engine compartment below a riders area. An internal combustion engine frequently lies within the engine compartment in front of a tunnel formed on the underside of the watercraft hull. The internal combustion engine commonly powers a jet propulsion device located within the tunnel. An impeller shaft commonly extends between the engine and the propulsion device for this purpose.

Personal watercrafts often employ an in-line, multi-cylinder, crankcase compression, two-cycle engine. The engine conventionally lies within the engine compartment with the in-line cylinders aligned along a longitudinal axis of the watercraft hull (in the bow to stein direction).

A dedicated carburetor usually supplies fuel to each cylinder of the engine. Because of the sporting nature of the watercraft and the tendency for frequent, abrupt directional changes of the watercraft when used, prior personal watercraft engine employ floatless-type carburetors. A fuel system used with the floatless-type carburetors continuously supplies fuel from a fuel tank to the carburetors while returning excess fuel to the fuel tank.

Though floatless carburetors improve fuel delivery to the engine's intake, prior fuel supply systems have not been so immune to abrupt directional changes. The fuel pick-up port in the fuel tank often is exposed to air when the watercraft leans in a turn, especially when the fuel level within the tank is low. Air in the fuel line produces a number of adverse affects. The fuel/air ratio of the charge delivered to the engine cylinders is reduced which results in poor engine performance. Air in the fuel line also can destroy the fuel pump's prime, as well as cause some fuel pumps to run hotter and damage the pump either immediately or over time (i.e., reduce the pump's durability).

Carburetored engines also tend to produce a fuel charge of a less than accurate fuel/air ratio. Consequently, engine performance is not optimized under all running conditions and greater pollutants can result.

SUMMARY OF THE INVENTION

The present watercraft includes a fuel injection engine in order to improve the accuracy of the fuel/air ratio of charge delivered to the engine cylinders, as well as to reduce pollutants. The adaptation of a fuel injected engine into the small watercraft raises some formidable changes, however, such as, for example, excessive heating of the fuel and the fuel pump of the fuel injection system within the enclosed engine compartment of a small watercraft.

One aspect of the present invention thus involves a small watercraft having a hull including an engine compartment. An internal combustion engine is positioned within the engine compartment and powers a propulsion device of the watercraft. A fuel supply system includes a fuel pump which draws fuel from a vapor separator and supplies fuel to at least one charge former of the engine through a fuel supply line. The vapor separator removes fuel vapors from the fuel before the pump delivers the fuel to the charge formers to reduce at least one detrimental effect that excessive heat in the engine compartment has on the fuel supply system.

The fuel pump desirably is at least partially located within the vapor separator. The fuel within the vapor separator cools the fuel pump. The durability of the fuel pump improves as a result This design also provides a compact arrangement for the fuel system.

Another aspect of the present invention involves a small watercraft having a hull that defines an engine compartment. A fuel-injected, internal combustion engine is positioned within the engine compartment and powers a propulsion device of the watercraft. A fuel supply system of the engine includes a fuel pump which supplies fuel to at least one fuel injector of the engine. The fuel pump is located in front of the engine. In a preferred embodiment, the fuel pump is a mechanical pump driven by the engine.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF PREFERRED EMBODIMENTS OF THE INVENTION

Figure 1:
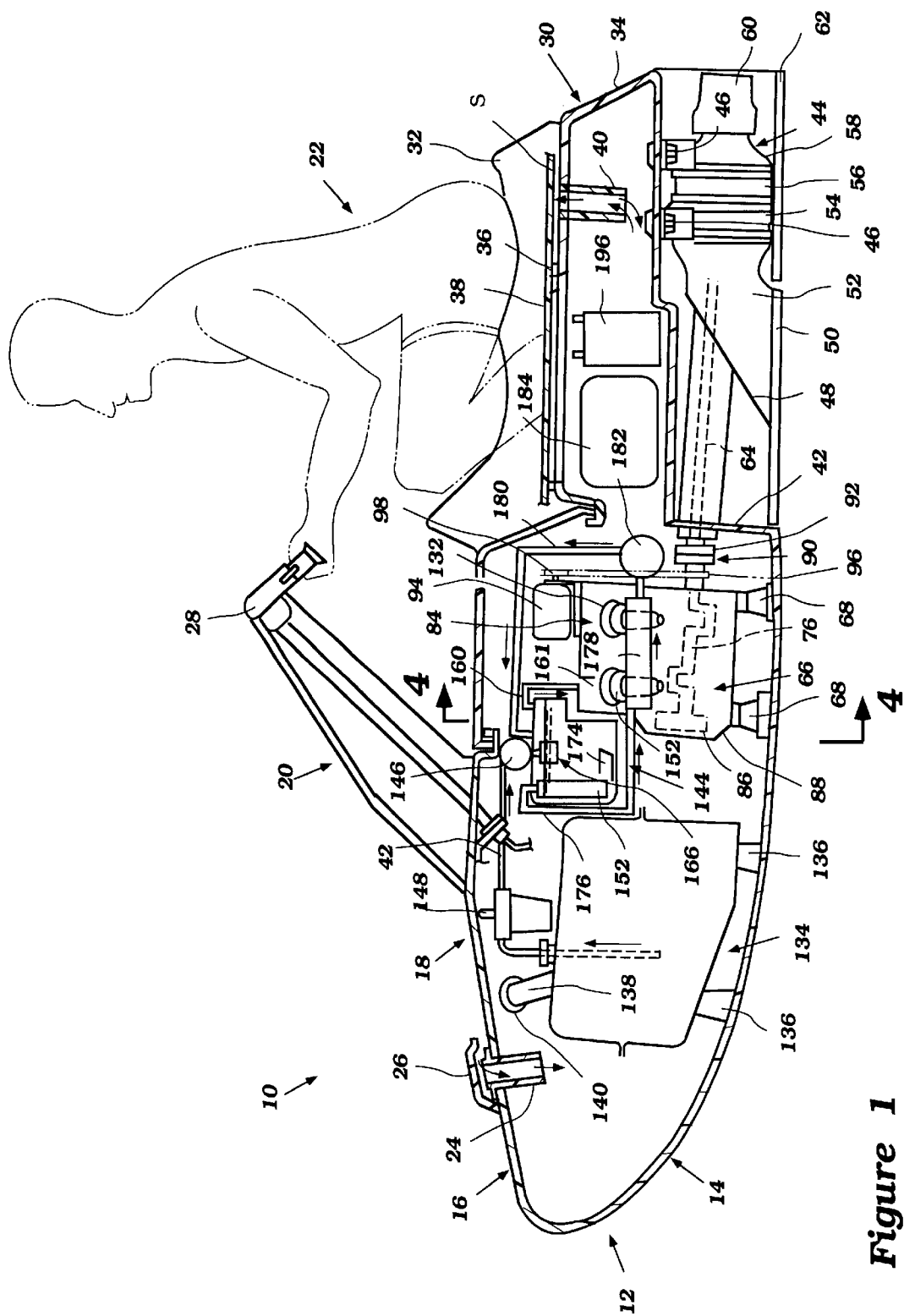
FIG. 1 is a partial side sectional view of a personal watercraft illustrating an engine with a fuel supply and injection system configured in accordance with a preferred embodiment of the present invention.

FIG. 1 illustrates a personal watercraft 10 which includes a fuel supply system configured in accordance with a preferred embodiment of the present invention. Although the present fuel supply system is illustrated in connection with an engine for a personal watercraft, the fuel supply system can be used with other types of watercraft as well, such as, for example, but without limitation, small jet boats and the like.

Before describing the fuel supply system, an exemplary personal watercraft 10 will first be described in general details to assist the reader's understanding of the environment of use, the preferred arrangement of the fuel supply system within the watercraft 10, and the operation of the fuel supply system. The watercraft 10 includes a hull 12 formed by a lower hull section 14 and an upper deck section 16. The hull sections 14, 16 are formed from a suitable material such as, for example, a molded fiberglass reinforced resin. The lower hull section 14 and the upper deck section 16 are fixed to each other around the peripheral edges in any suitable manner.

As viewed in the direction from the bow to the stern of the watercraft, the upper deck section 16 includes a bow portion 18, a control mast 20 and a rider's area 22. The bow portion 18 slopes upwardly toward the control mast 20 and includes at least one air duct 24 through which air can enter the hull. A cover 26 extends above an upper end of the air duct 24 to inhibit an influx of water into the hull.

The control mast 20 extends upward from the bow portion 18 and supports a handlebar assembly 28. The handlebar 28 controls the steering of the watercraft 10 in a conventional manner. The handlebar assembly 28 also carries a variety of controls of the watercraft 10, such as, for example, a throttle control, a start switch and a lanyard switch.

The rider's area 22 lies behind the control mast 20 and includes a seat assembly 30. In the illustrated embodiment, the seat assembly 30 has a longitudinally extending straddle-type shape which may be straddled by an operator and by at least one or two passengers. The seat assembly 30, at least in principal part, is formed by a seat cushion 32 supported by a raised pedestal 34. The raised pedestal 34 has an elongated shape and extends longitudinally along the center of the watercraft 10. The seat cushion 32 desirably is removably attached to a top surface 36 of the pedestal 34 and covers the entire upper end of the pedestal for rider and passenger comfort.

An access opening 38 is located on an upper surface 36 of the pedestal 34. The access opening 38 opens into an engine compartment formed within the hull. The seat cushion 32 normally covers and seals closed the access opening 38. When the seat cushion 32 is removed, the engine compartment is accessible through the access opening 38.

The pedestal 34 also includes a rear air duct 40 located behind the access opening 38. The air duct 40 communicates with the atmosphere through a space between the pedestal 34 and the cushion 32 which is formed behind the access opening 38. Air passes through the rear duct 40 in both directions, as schematically illustrated in FIG. 1.

The upper deck section 16 of the hull 12 advantageously includes a pair of raised gunnels (not shown) positioned on opposite sides of the aft end of the upper deck assembly 16. The raised guunels define a pair of foot areas that extend generally longitudinally and parallel to the sides of the pedestal 34. In this position, the operator and any passengers sitting on the seat assembly 30 can place their feet in the foot areas with the raised gunnels shielding the feet and lower legs of the riders. A non-slip (e.g., rubber) mat desirably covers the foot areas to provide increased grip and traction for the operator and the passengers.

The lower hull portion 14 principally defines the engine compartment. Except for the air ducts 24, 40, the engine compartment is normally substantially sealed so as to enclose an engine and the fuel system of the watercraft 10 from the body of water in which the watercraft is operated.

Figure 4:
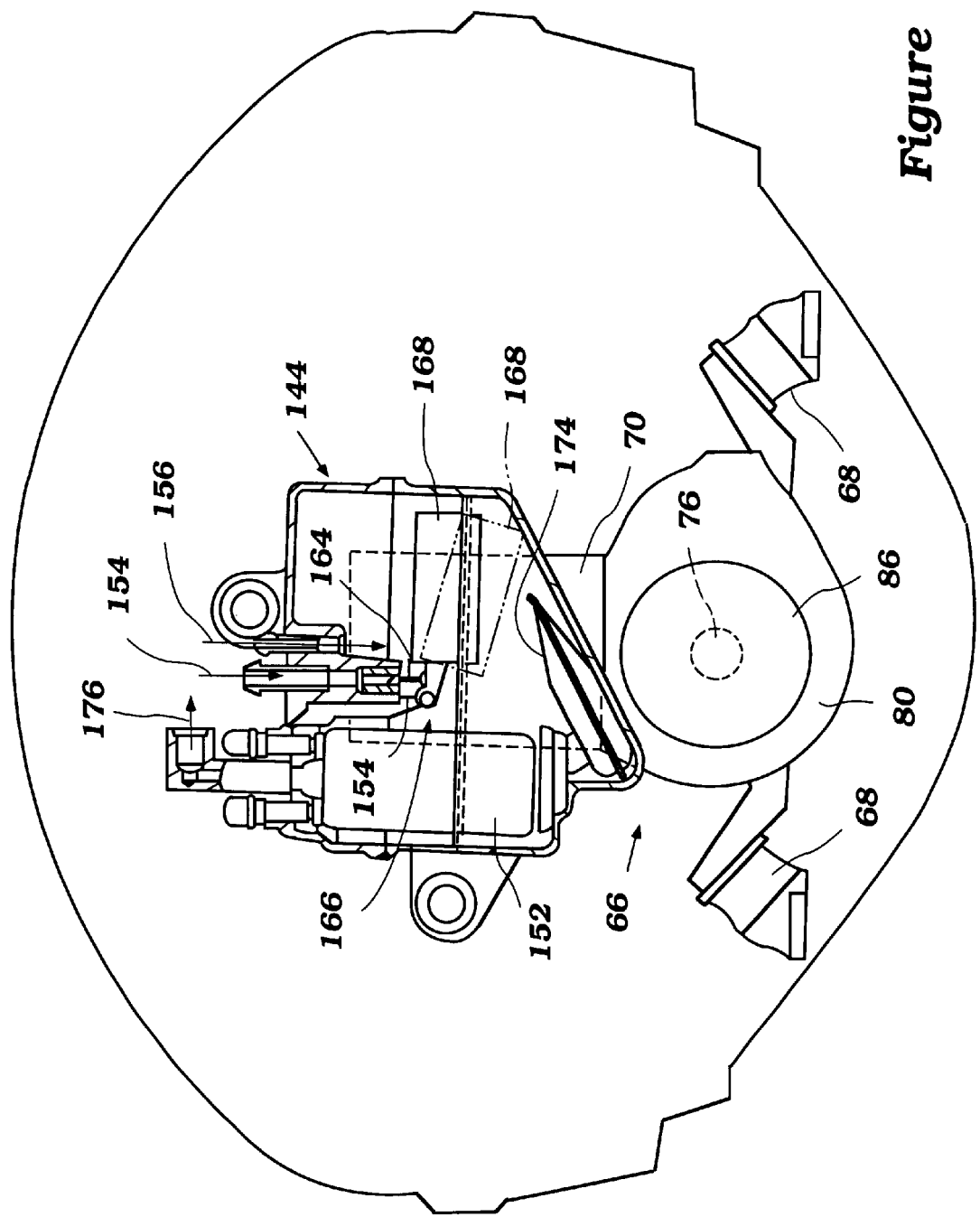
FIG. 4 is a cross-sectional view of the watercraft taken along line 4—4 of FIG. 1.

The lower hull 14 is designed such that the watercraft 10 planes or rides on a minimum surface area of the aft end of the lower hull 14 in order to optimize the speed and handling of the watercraft 10 when up on plane. For this purpose, the lower hull section generally has a V-shaped configuration formed by a pair of inclined section that extend outwardly from the keel line to outer chines at a dead rise angle. The inclined sections extend longitudinally from the bow toward the transom of the lower hull 14 and is seen in FIG. 4, extend outwardly to side walls of the lower hull. The side walls are generally flat and straight near the stern of the lower hull and smoothly blend towards the longitudinal center of the watercraft at the bow. The lines of intersection between the inclined section and the corresponding side wall form the outer chines of the lower hull section.

Toward the transom of the watercraft, the incline sections of the lower hull extend outwardly from a recessed channel or tunnel 42 that extends upward toward the upper deck portion 16. The tunnel 42 has a generally parallelepiped shape and opens through the rear of the transom of the watercraft 10, as seen in FIG. 1.

In the illustrated embodiment, a jet pump unit 44 propels the watercraft. The jet pump unit 44 is mounted within the tunnel 42 formed on the underside of the lower hull section 16 by a plurality of bolts 46. An intake duct 48 of the jet pump unit 44 defines an inlet opening 50 that opens into a gullet 52. The gullet 52 leads to an impeller housing 54 in which the impeller of the jet pump 44 operates. An impeller duct assembly 56, which acts as a pressurization chamber, delivers the water flow from the impeller housing to a discharge nozzle housing 58.

A steering nozzle 60 is supported at the downstream end of the discharge nozzle 58 by a pair of vertically extending pivot pins. In an exemplary embodiment, the steering nozzle 60 has an integral lever on one side that is coupled to the handlebar assembly 28 through, for example, a bowden-wire actuator, as known in the art. In this manner, the operator of the watercraft can move the steering nozzle 58 to effect directional changes of the watercraft 10.

A ride plate 62 covers a portion of the tunnel 42 behind the inlet opening 50 to enclose the pump chambers 54, 56 and the nozzle assembly 58 within the tunnel 42. In this manner, the lower opening of the tunnel 42 is closed to provide a planing surface for the watercraft.

An impeller shaft 64 supports the impeller within the impeller housing 54. The aft end of the impeller shaft 64 is suitably supported and journalled within the compression chamber 56 in a known manner. The impeller shaft 64 extends in the forward direction through a front wall of the tunnel 42. A protective casing surrounds a portion of the impeller shaft 64 that lies forward of the intake gullet 52. In the illustrated embodiment, the protective casing has a tubular shape and is integrally formed with the intake duct 48.

An internal combustion engine 66 of the watercraft powers the impeller shaft 64 to drive the impeller of the jet pump unit 44. The engine 66 is positioned within the engine compartment and is mounted primarily beneath the control mast 20. Vibration-absorbing engine mounts 68 secure the engine 66 to the lower hull portion 14 in a known manner. The engine 66 is mounted in approximately a central position in the watercraft 10.

In the illustrated embodiment, the engine 66 includes two in-line cylinders 67 and operates on a two-stroke, crankcase compression principle. The engine 66 is positioned such that the row of cylinders lies parallel to a longitudinal axis of the watercraft 10, running from bow to stem. This engine type, however, is merely exemplary. Those skilled in the art will readily appreciate that the present fuel delivery system can be used with any of a variety of engine types having other number of cylinders, having other cylinder arrangements and operating on other combustion principles (e.g., four-stroke principle).

Figure 2:
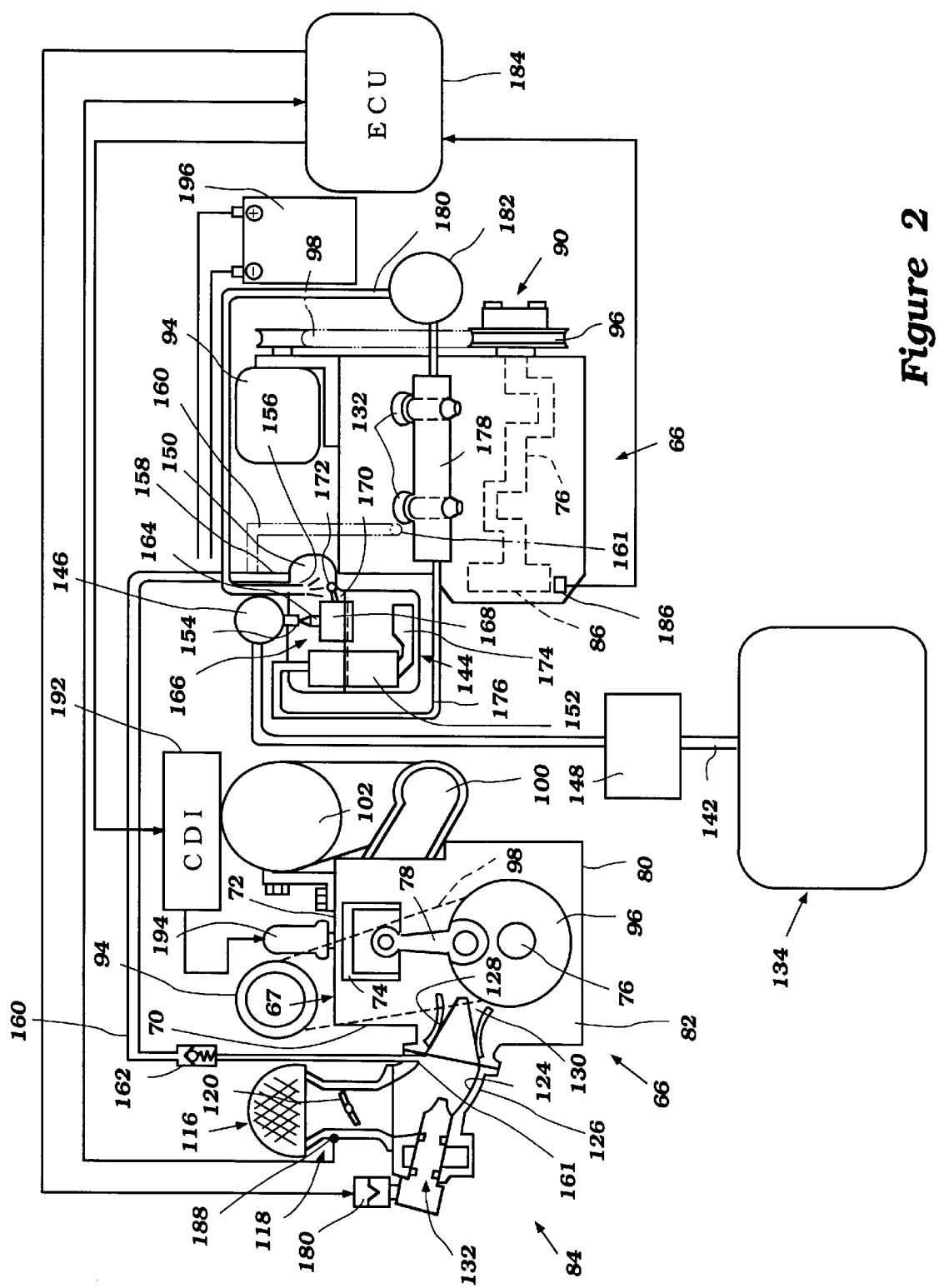
FIG. 2 is a schematic layout of the engine and fuel supply and injection system of FIG. 1 together with an associated control system.

As best seen in FIG. 2, a cylinder block 70 and a cylinder head assembly 72 desirably from the cylinders of the engine. A piston 74 reciprocates within each cylinder of the engine 66 and together the pistons 74 drive an output shaft 76, such as a crankshaft, in a known manner. A connecting rod 78 links the corresponding piston 74 to the crankshaft 76. The corresponding cylinder bore, piston and cylinder head of each cylinder forms a variable-volume chamber, which at a minimum volume defines a combustion chamber.

The crankshaft 76 desirably is journalled within a crankcase, which in the illustrated embodiment is formed between a crankcase member 80 and a lower end of the cylinder block 70. Individual crankcase chambers 82 of the engine are formed within the crankcase by dividing walls and sealing disks, and are sealed from one another with each crankcase chamber communicating with a dedicated variable-volume chamber. Each crankcase chamber 82 also communicates with a charge former of an induction system 84 (which is described below in detail) through a check valve (e.g., a reed-type valve). Because the internal details of the engine 66 desirably are conventional, a further description of the engine construction is not believed necessary to understand and practice the invention.

The output shaft 76 carries a flywheel assembly 86 on a front end of the shaft at a position forward of the row of cylinders. The flywheel assembly 86 includes a flywheel magneto which forms part of a spark timing circuit, as described below. A cover 88 is attached to the front end of the cylinder block 70 and cylinder head 72 to enclose the flywheel assembly 86.

As seen in FIG. 1, a coupling 90 interconnects the engine crankshaft 76 to the impeller shaft 64. A bearing assembly 92, which is secured to the bulkhead, supports the impeller shaft 64 behind the shaft coupling 90.

As seen in FIG. 1, the output shaft 76 drives a generator 94 (e.g., an alternator) to produce electricity for the watercraft 10. For this purpose, the output shaft 76 carries a drive pulley 96 at a position between the coupling 90 and a rear surface of the engine 66. Alternatively, an intermediate shaft can connect the output shaft to the coupling and carry the drive pulley. The generator 94 is mounted to the cylinder head 72 and includes a pulley coupled to an input shaft of the generator 94. In the illustrated embodiment, the axes of the generator input shaft 76 and the engine output shaft lie in parallel, and the generator pulley lies within the same transverse plane as the drive pulley 96, and desirably lies directly above the drive pulley 96. A belt 98 interconnects together the drive pulley 96 and the generator pulley such that the drive pulley 96 drives the generator pulley, i.e., the pulleys rotate together.

Figure 3:
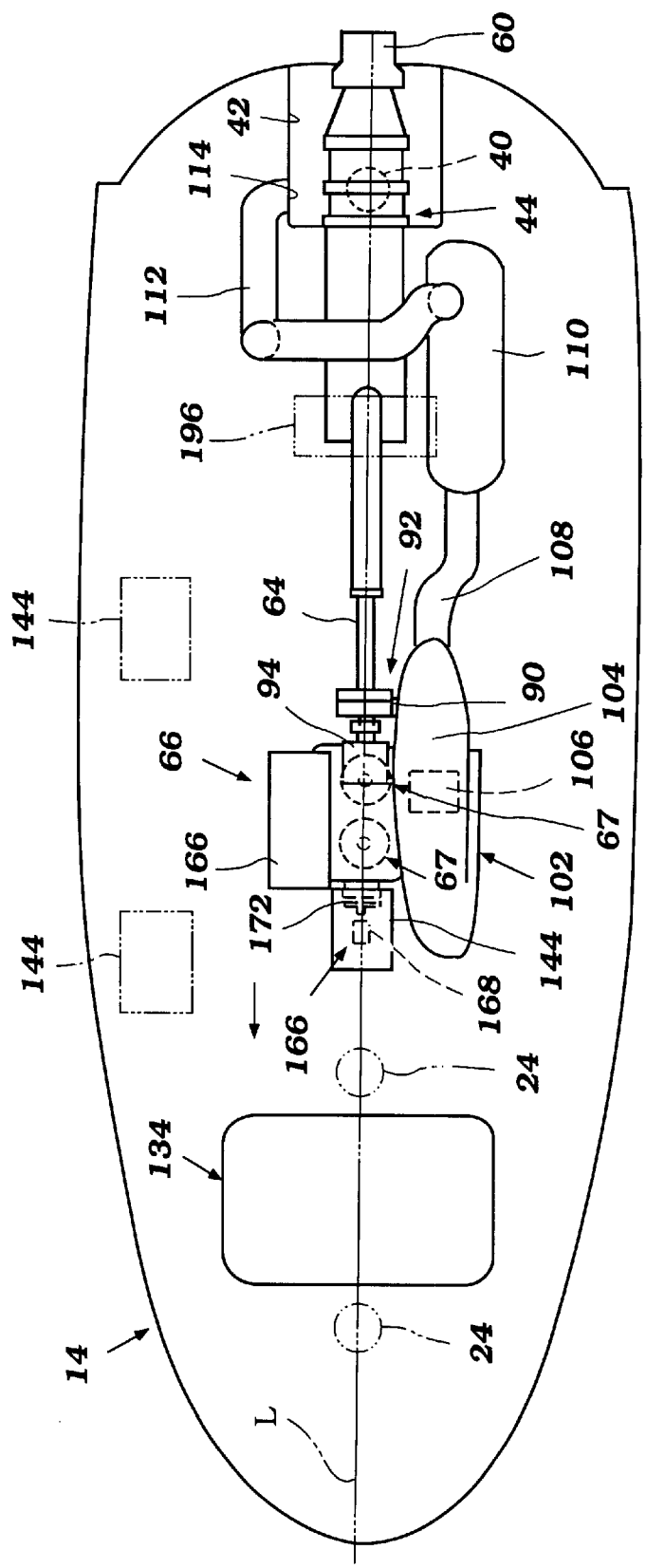
FIG. 3 is a sectional top plan view of the watercraft of FIG. 1 illustrating the arrangement of the watercraft's components within a hull of the watercraft.

With reference to FIGS. 1–3, an exhaust system is provided to discharge exhaust byproducts from the engine 66 to the atmosphere and/or to the body of water in which the watercraft 10 is operated. The exhaust system includes an exhaust manifold 100 that is affixed to the side of the cylinder block 70 and which receives exhaust gases from the variable-volume chambers through exhaust ports in a wellknown manner.

An outlet end of the exhaust manifold 100 communicates with a C-shaped pipe section. This C-pipe includes an inner tube that communicates directly with the discharge end of the exhaust manifold 100. An outer tube surrounds the inner tube to form a coolant jacket between the inner and outer tubes. Although not illustrated, the C-pipe includes an inlet port positioned near its inlet end. The inlet port communicates with a waterjacket of the engine 66.

The outlet end of the C-pipe communicates with an expansion chamber 102. In the illustrated embodiment, the expansion chamber 102 has a tubular shape in which an expansion volume 104 is defined within an annular, thick wall. Coolant jacket passages extend through the expansion chamber wall and communicate with the coolant jacket of the C-pipe.

A flexible coupling connects the outlet end of the C-pipe to the inlet end of the expansion chamber 102. The flexible coupling also can include an outlet port which communicates with an internal coolant passage within the flexible coupling. The coolant passage places the coolant jacket and the coolant passages in communication.

The outlet end of the expansion chamber 102 is fixed to reducer pipe which tapers in diameter toward its outlet. The pipe has a dual shell construction formed by an inner shell which defines an exhaust flow passage. The expansion volume 104 communicates with this passage.

An outer shell is connected to the inner shell and defines a cooling jacket about the inner shell. The coolant jacket passages of the expansion chamber communicate with the coolant jacket of the pipe to discharge a portion of the coolant with the exhaust gases.

A catalyzer 106 can be disposed within the space defined at the mating ends of the expansion chamber and the reducer pipe. For instance, the catalyzer 106 can include an annular shell supporting a honeycomb-type catalyst bed. The catalyst bed is formed of a suitable catalytic material such as that designed to treat and render harmless hydrocarbons, carbon monoxide, and oxides of nitrogen. An annular flange supports the annular shell generally at the center of the flow path through the expansion chamber volume. In this manner, all exhaust gas flow through the expansion chamber 102 passes through the catalyst bed. The annular flange can be held between outlet end of the expansion chamber and the inlet end of the reducer pipe.

The lower section of the reducer pipe includes a downwardly turned portion that terminates at the discharge end. The inner shell stops short of the outer shell such that the water flow through the water jacket merges with the exhaust gas flow through the exhaust passage at the discharge end.

A flexible pipe 108 is connected to the discharge end of the reducer pipe and extends rearward along one side of the watercraft hull tunnel 42. The flexible conduit 108 connects to an inlet section of a water trap device 110. The water trap device 110 also lies within the watercraft hull 12 on the same side of the tunnel 42.

The water trap device 110 has a sufficient volume to retain water and to preclude the back flow of water to the expansion chamber 102 and the engine 66. Internal baffles within the water trap device 110 help control water flowing through the exhaust system.

An exhaust pipe 112 extends from an outlet section of the water trap device 110 and wraps over the top of the tunnel 42 to a discharge end 114. The discharge end 114 desirably opens into the tunnel 42 at an area that is close to or actually below the water level with the watercraft 10 floating at rest on the body of water.

As seen in FIG. 2, the induction system 84 is located on a side of the engine 66 opposite of the exhaust system and supplies a fuel/air charge the variable-volume chambers. In the illustrated embodiment, the induction system 84 includes an air intake silencer 116. The silencer 116 is located above the engine 66 and includes a plenum chamber.

The plenum chamber of the silencer 116 communicates with a plurality of throttle devices 118. The engine 66 desirably includes a number of throttle devices 118 equal in number to the number of cylinders. In the illustrated embodiment, the throttle devices 118 are throttle valves. A throttle shaft supports a butterfly-type valve plate 120 within a throat 122 of the throttle valve 118.

Each throttle valve 118 communicates with an intake passage 124 of an intake manifold 126. The manifold 126 is attached to the crankcase member 80 and/or cylinder block 70 to place each intake passage 124 in communication with one of the crankcase chambers 82. In the illustrated embodiment, the intake passage 124 desirably has an arcuate shape with a portion of the passage 124 extending generally transverse to a rotational axis of the crankshaft 76 and to a longitudinal axis of the watercraft 10. As a result, the throttle valve 118 and intake silencer 116 are distanced from the cylinder block and cylinder head assemblies 70, 72.

A check valve (e.g., a reed valve) is disposed within each intake passage 124 at the junction between the intake manifold 126 and the crankcase member 80. In the illustrated embodiment, a reed valve assembly 128 includes a pair of reed valves 130 which open upon upward movement of the piston 74 to permit an influx of a fuel/air charge into the corresponding crankcase camber 82 and close upon downward movement of the piston 74 to inhibit reverse air flow from the chamber 82 into the intake manifold 126.

The engine 66 also desirably includes the same number of charger formers as the number of cylinders. In the illustrated embodiment, the charger formers are fuel injectors 132 which spray fuel into the corresponding intake passage 124; however, the present fuel delivery system can be used with other types of charge formers and arrangements of the charge formers within the engine (e.g., direct injection) as well.

The fuel delivery system supplies fuel to the fuel injectors 132. The fuel delivery system includes a main fuel tank 134 located within the hull 12. In the illustrated embodiment, a plurality of vibration-damping mounts 136 support the fuel tank 134 at a position in front of the engine 66. Any of a variety of known means, such as, for example, straps, can be used to secure the fuel tank 134 to the lower hull portion 14 in this position.

A fuel filler hose 138 extends between a filler cap assembly 140 and the fuel tank 134. In the illustrated embodiment, the filler cap assembly 140 is secured to the bow portion 18 of the hull upper deck 16 to the side and in front of the control mast 20. In this manner, the fuel tank 134 can be filled from outside the hull 12 with the fuel passing through the fuel filler hose 138 into the fuel tank 134.

As seen in FIGS. 1 and 2, a fuel supply line 142 links the fuel tank 134 and a vapor separator assembly 144. A low pressure fuel pump 146 is located within the fuel supply line 142 to produce a flow of fuel into the vapor separator assembly 144. The low pressure fuel pump 146 draws fuel through a stand pipe in the fuel tank 134, through a portion of the fuel supply line 134 and through a fuel filter 148 before the fuel is delivered to a fuel bowl 150 of the vapor separator assembly 144.

The low pressure fuel pump 146 can either be mechanically or electrically driven. For instance, in the illustrated embodiment, the low pressure fuel pump 146 is driven by an electric motor. The pump, however, can be a diaphragm pump operated by the changing pressure within one of the crankcase chambers.

The vapor separator assembly 144 includes a vapor separator as well as a highpressure pump 152 which is positioned within the housing of the vapor separator assembly 144. The housing defines an inner cavity 150 which forms the fuel bowl of the vapor separator. The housing can have a sloped bottom surface to funnel the fuel towards an influent port of the pump 152 which is generally positioned at the bottom of the fuel bowl.

The housing defines an inlet port 154, a return port 156, and a vapor discharge port 158. The vapor discharge port 158 is positioned to the side of the inlet port 154 at a position proximate to the upper end of the housing. A breather conduit 160 connects the vapor discharge port 158 to one or more of the intake passages 124 of the induction system 84 as illustrated in FIG. 2. In the illustrated embodiment, the breather passage 160 terminates at a port 161 located near the reed valve assembly 128. The port 161 desirably lies at a level below the vapor discharge port 158—in order to inhibit an ingress of water into the fuel system through the breather passage 160.

A check-type valve 162 desirably is placed within the breather conduit 160 to permit fuel flow through the line 160 only in the direction from the vapor separator 144 to the intake passage 124. In this manner, the valve 162 prevents any water which might enter the induction system 84—for instance when the watercraft 10 is capsized—from entering the fuel supply system through the breather conduit 160.

The inlet port 154 connects to the fuel supply line 142 that extends from the low pressure pump 146. A needle valve 164 operates at a lower end of the intake port 154 to regulate the amount of fuel within the fuel bowl 150. A float 166 within the fuel bowl actuates the needle valve 164. The float 166 includes a buoyant body 168 supported by a pivot arm 170. The pivot arm 170 is pivotally attached to an inner flange within the housing by a pivot shaft 172 and at a point proximate to the lower end of the housing inlet port 154. The pivot arm also supports the needle valve 164 in a position lying directly beneath a valve seat formed on the lower end of the inlet port 154. Movement of the pivot arm 170 causes the needle valve 164 to open and close the inlet port 154 by either seating against or moving away from the valve seat, depending upon the rotational direction of the pivot arm 170.

In the illustrated embodiment, the pivot shaft 172 extends in a direction which is generally parallel to the longitudinal axis as well as the direction of travel of the watercraft 10. This orientation of the pivot shaft 172 generally isolates the function of the float 166 from turning movements of the watercraft 10. That is, the movement of the watercraft 10 when turning does not cause the float 166 to rotate about the pivot shaft 172. The pivot shaft 172, in the alternative as illustrated in FIG. 4, can extend in a direction generally transverse to the direction of travel in order to isolate the float 166 from moments produced when the watercraft 10 accelerates or decelerates.

When the fuel bowl 150 contains a low level of fuel, the float 166 lies in a lower position (as represented in FIG. 2). The needle valve 164 is opened with the float 166 in this lowered position and fuel flows from the low pressure pump 146, through the delivery conduit 142 and into the fuel bowl 150 through the inlet port 154. When the fuel bowl 150 contains a preselected amount of fuel, the float 166 rises to a level where it causes the needle valve 164 to seat against valve seat at the lower end of the inlet port 154. The preselected amount of fuel desirably lies below the inlet port 154, the return port 156 and the vapor discharge port 158.

In the illustrated embodiment, the high pressure pump 152 is integrated into the vapor separator housing assembly 144. The high pressure pump 152 draws fuel into its influent port trough a fuel strainer 174. The fuel strainer 174 lies generally at the bottom of the fuel bowl 150.

The pump 152 includes an electric motor which drives an impeller shaft of the pump 152. The impeller shaft supports an impeller that rotates in a pump cavity. In an exemplary embodiment, the pump is a centrifugal pump; however, other types of pumps, such as a rotary vane pump, can be used as well.

The vapor separator assembly 144 can include a lid which is removably attached to a base portion of the housing by a plurality of conventional fasteners. A seal extends around the periphery of the housing at the joint between the lid and the housing base.

With reference to FIG. 2, the high pressure side of the fuel delivery system supplies fuel to the fuel injectors 132 of the induction system 84. The high pressure pump 152 draws fuel from the fuel bowl 150 of the vapor separator 144 and pushes the fuel through a conduit 176 which is connected to a fuel rail or manifold 178. The pump 152 delivers fuel under high pressure through the conduit 176 to the fuel rail 178. A check valve (not shown) is disposed within the conduit 176 to prevent a back-flow of fuel from the fuel rod 178.

The fuel rail 178 has an elongated shape. An inlet port of the fuel rail 178 communicates with the conduit 176 which carries fuel from the high pressure pump 152. The inlet port opens into a manifold chamber which extends along the length of the fuel rail 178.

The fuel rail 178 delivers fuel to each fuel injector 132. For this purpose, the manifold chamber of the fuel rail 178 communicates with the plurality of supply ports defined along the length of the fuel rail 178. Each supply port receives an inlet end of the corresponding fuel injector 132 and communicates with an inlet port of the fuel injector 132 to supply the fuel injector 132 with fuel.

In the illustrated embodiment, the fuel rail 178 lies generally parallel to the direction of travel of the watercraft 10, and also to the longitudinal axis of the watercraft 10 and the rotational axis of the crankshaft 76. Fuel desirably flows through the fuel rail 178 in a direction from bow to stem in order to utilize the momentum of the fuel toward the watercraft's stem to increase the pressure within the fuel rail 178.

As a result, a smaller size high pressure pump 152 can be used. The fuel can flow in the opposite direction, i.e., stern to bow, but this would require a larger size pump.

A fuel return line 180 extends between an outlet port of the fuel rail 178 and the fuel bowl 152 of the vapor separator 144. The return line 180 completes the flow loop defined by the high pressure side of the fuel supply system to generally maintain a constant flow of fluid through the fuel rail 178. The constant fuel flow through the high pressure side of the fuel delivery system inhibits heat transfer to the fuel and thus reduces fuel vaporization in the fuel rail 178.

A pressure regulator 182 is positioned within the return line 180. The pressure regulator 182 generally maintains a desired fuel pressure at the injectors (e.g., 50–100 atm). The regulator 182 regulates pressure by dumping excess fuel back to the vapor separator 144, as known in the art.

A control system manages the operation of the engine 66. The control system includes an electronic control unit (ECU) 184 that receives signals from various sensors regarding a variety of engine functions. As schematically illustrated in FIG. 2, a crankcase position sensor 186 senses the angular position of the crankshaft 76 and also the speed of its rotation. The sensor 186 produces a signal(s) which is indicative of angular orientation and speed. Another sensor 188 determines the throttle orientation to determine the opening degree of the throttle valves 118. The sensor 188 produces a signal indicative of the throttle valve position.

The ECU 184 receives these signals from the sensors 186, 188 to control injection timing and duration, as well as spark timing. For this purpose, the ECU 184 communicates with each fuel injector 132, and specifically the solenoid 190 used with each fuel injector 132. The ECU 184 controls the operation of the solenoid 190 in order to manage fuel injection timing and duration, the latter affecting the fuel/air ratio of the produced charge. The desired stoichiometric fuel/air ratio will depend upon the amount of air flow into the engine 66, which is a function of the opening degree of the throttle valve 120. This information is stored within a memory device with which the ECU 184 communicates. The ECU 184 thus processes the information signal received from the throttle valve sensor 188 and determines the amount of fuel to be injected for the sensed operating condition of the engine. The ECU 184 also uses the information from the crankshaft sensor 186 to determine the point during the engine's revolution to initiate fuel injection.

In addition to controlling fuel injection, the ECU 184 also control ignition timing. For this purpose the ECU controls a capacitor discharge ignition unit 192, and the firing of the spark plugs 194. The generator 94 powers one or more charging coil (schematically illustrated as part of the capacitor discharge ignition unit) which increases the voltage of the charge eventually delivered to the spark plugs 194. The generator 94 also charges one or more batteries 196, as known in the art.

The capacitor discharge unit 192 desirably controls the discharge of one ignition coil for each spark plug 196. The capacitor discharge ignition unit 192 receives a signal from the ECU 184 which manages the discharge timing.

The arrangement of the components of the engine 66, engine control system, fuel supply system and exhaust system are illustrated in FIGS. 1, 3 and 4. The vapor separator 144 desirably lies between the front end of the engine 66 and the main fuel tank 134, in a space above the flywheel magneto 86. The vapor separator 144 thus lies in an air flow stream between the air ducts 24, 40, and near the air flow into the induction system 84. The air flow over the vapor separator 144 cools the fuel.

The fuel pump 152 also lies in a similar position within the engine compartment, and thus is cooled by these air flow streams. The fuel within the fuel bowl 152 of the vapor separator 144 also dissipates heat from the high pressure fuel pump 152. As a result, the fuel pump 152 runs cooler and the durability and life-span of the pump 152 tends to increase.

In the illustrated embodiment, the air ducts 24, 40 are positioned to lie on a longitudinal center line L of the watercraft hull 10. The output shaft 76 of the engine 66, as well as the row of cylinders also lie on the longitudinal center line L for watercraft balance.

As seen in FIG. 3, the position of the front air duct 24 can lie either forward or reward of the main fuel tank 134. For ventilation purposes, however, the air duct 24 desirably lies in front of the fuel tank 134.

FIG. 3 also schematically illustrates that the vapor separator 144 can be positioned at alternative locations within the engine compartment. The vapor separator 144 can be mounted to the side wall of the watercraft hull 12. In the two alternative exemplary locations illustrated in FIG. 3, the vapor separator 144 lies either forward of the front end of the engine 66 or behind the rear end of the engine 66. In either of these locations, dampers desirably lie between the hull wall and the vapor separator assembly 144. The vapor separator 144 in either of these positions also lies on a side of the longitudinal center line opposite of the water trap device 110.

As seen in FIGS. 1 and 3, the battery 196 and the ECU 184 desirably lie beneath the access opening 38 for easy access by a technician. In this location, the battery 196 also lies within the air stream between the air ducts 24, 40 for ventilation purposes.

Figure 5:
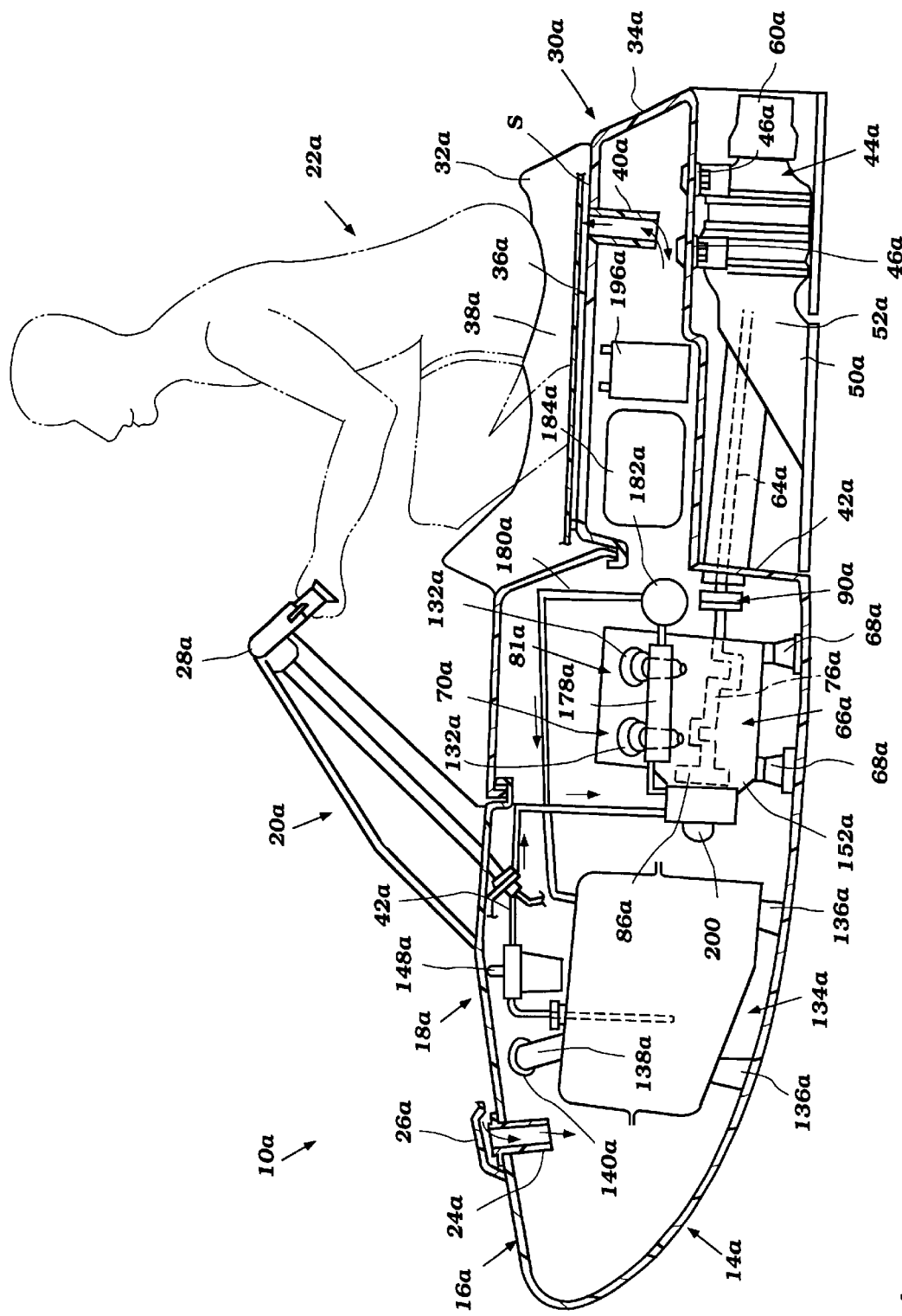
FIG. 5 is a partial side sectional view of a personal watercraft illustrating an engine with a fuel supply and injection system configured in accordance with another preferred embodiment of the present invention.
Figure 6:
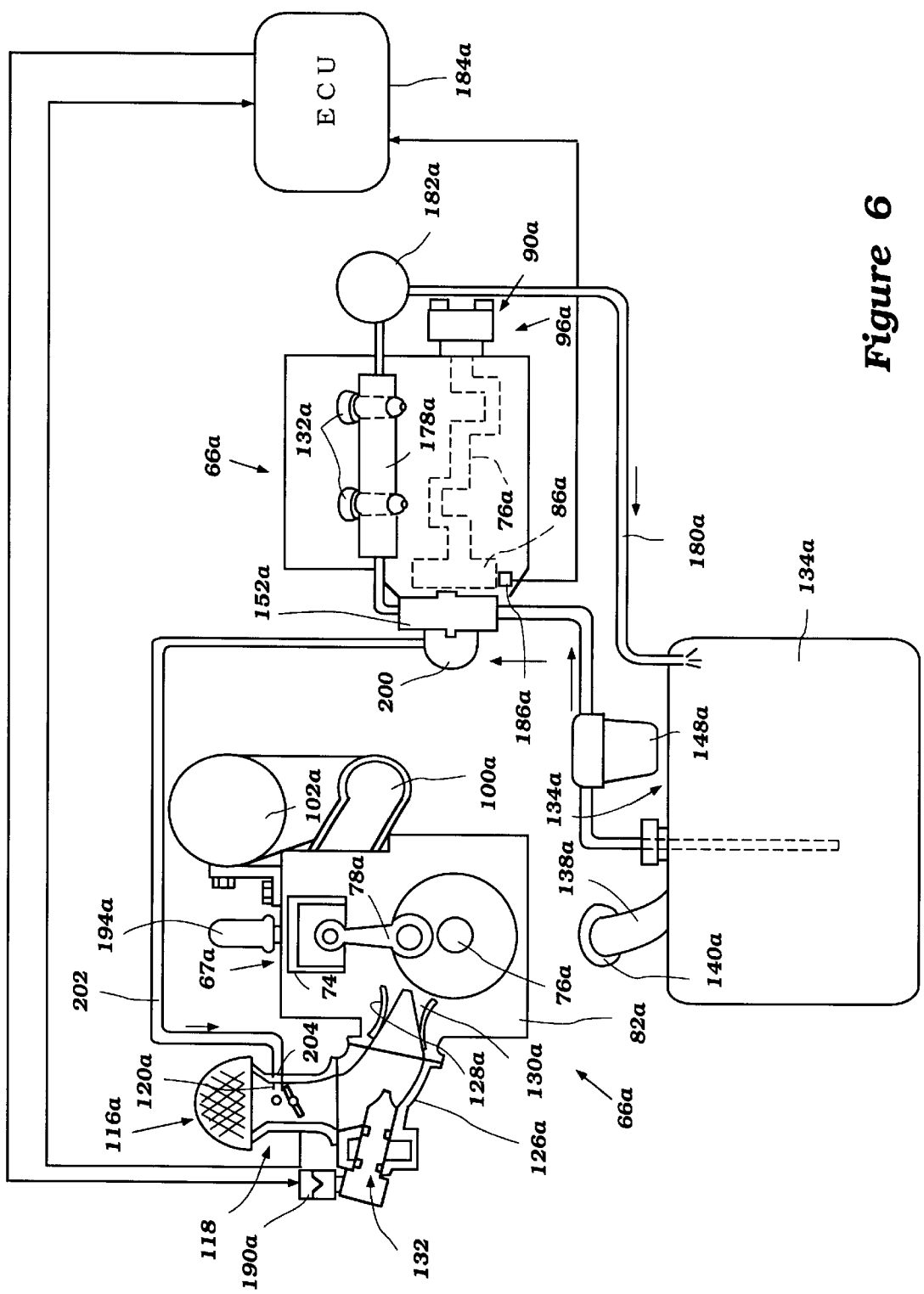
FIG. 6 is a schematic layout of the engine and fuel supply and injection system of FIG. 5 together with an associated control system.
Figure 7:
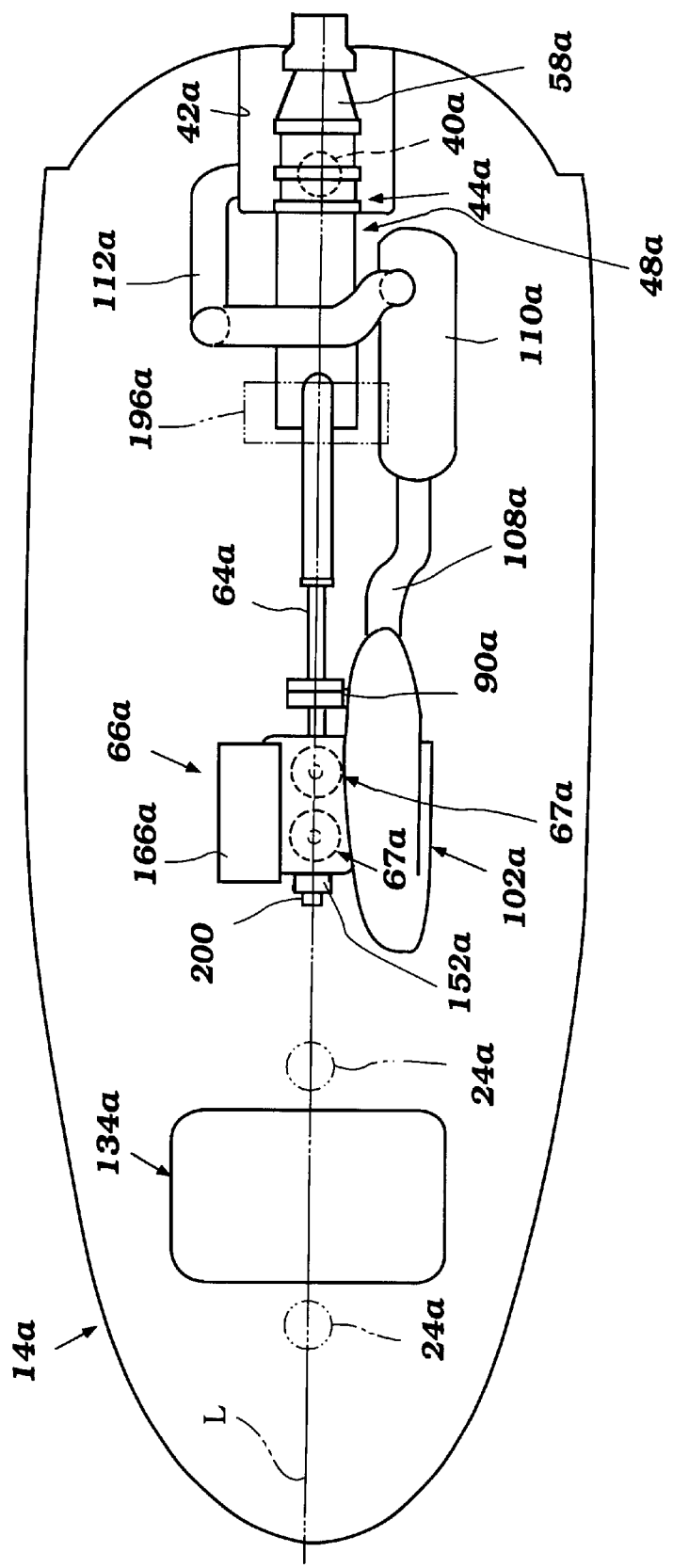
FIG. 7 is a sectional top plan view of the watercraft of FIG. 5 illustrating the arrangement of the watercraft's components within a hull of the watercraft.

FIGS. 5 through 7 illustrate another embodiment of the fuel delivery system which is similar to the embodiment described above, except for the elimination of the vapor separator. For this reason, like reference numerals with an "a" suffix have been used to indicate like parts between the two embodiments.

The fuel delivery system includes a high pressure pump 152a. An input shaft of the pump desirably is driven by the output shaft 76a of the engine 66a. In the illustrated embodiment, the input shaft of the fuel pump 152a is connected to a front end of the crankshaft 76a which protrudes forward of the flywheel magneto 86a. The speed of the pump 152a thus corresponds to engine speed. A gear train also can be used between the output shaft 76a and the pump input shaft to produce a speed differential between the pump 152a and the output shaft 76a.

The high pressure pump 152a draws fuel through a fuel supply line 142a directly from the fuel tank 134a. The fuel flows through a fuel filter 148a before entering the high pressure pump 152a. From the pump 152a, the fuel flows through a fuel rail 178a connected to the fuel injectors 132a. A pressure regulator 182a establishes the pressure within the fuel rail 178a. In the illustrated embodiment, the pressure regulator 182a lies at the end of the fuel rail 178a, behind the rear end of the engine 66a. A return line 180a connects the pressure regulator 182a to the fuel tank 134a. The pressure regulator 182a thus dumps excess fuel into the fuel tank 134a through the return line 180a to maintain a desired fuel pressure. The pressure produced by the pump 152a, however, advantageously is higher than the desired fuel pressure at the injectors 132a so as to produce a flow of fuel through the fuel rail 178a to minimize the degree of heat exposure experienced by the fuel within the rail 178a.

The input shaft of the pump 152a also drives an oil pump 200 connected to an oil tank (not shown) by an oil supply line. The oil pump 200 delivers oil through an oil delivery line 202 to the induction system 84a for entrainment with the air flow therethrough. In the illustrated embodiment, the oil delivery line 202 communicates with a port 204 that communicates with the throat passage 122a of the throttle device 118a. The port 204 desirably lies upstream of the throttle valve 120a so as to lubricate the valve 120a.

FIGS. 5 and 7 illustrate the arrangement of the fuel delivery system within the watercraft hull 12a. The high pressure fuel pump 152a is located forward of the front end of the engine 66a, and desirably between the engine 66a and the fuel tank 134a. Both the fuel tank 134a and the pump 152a lie within an air stream between a pair of air ducts 24a, 40a that communicate with the engine compartment formed within the hull 12a. The air ducts 24a, 40a, as well as the fuel and oil pumps 152a, 200 and the fuel tank 134a desirably lie near a longitudinal center line of the hull 12a. The position of these components within the air flow stream between the ducts 24a, 40a cools the fuel and the pumps within the confined engine compartment. As a result, the consistency of the air/fuel ratio of the produced fuel charge increases and the durability of the pumps is improved.

Although tis invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A small watercraft comprising a longitudinally extending straddle-type seat and a steering operator positioned near a front section of the seat, a hull including an engine compartment, an internal combustion engine being positioned within the engine compartment and powering a propulsion device of the watercraft, the steering operator being coupled to the propulsion device, and a fuel supply system including a vapor separator, a fuel pump, at least one charge former, the fuel pump arranged to draw fuel from the vapor separator and to supply fuel to the at least one charge former of the engine through a fuel supply line, wherein the hull includes at least two air openings, the vapor separator being positioned between the air openings.

2. A small watercraft as in claim 1, wherein said fuel pump is at least partially located within the vapor separator.

3. A small watercraft as in claim 1, wherein said at least one charge former is a fuel injector, and said fuel supply system includes a fuel return line which communicates with the at least one fuel injector and the vapor separator to return excess fuel supplied to the at least one fuel injector to the vapor separator.

4. A small watercraft as in claim 1, wherein the fuel supply system includes a main fuel tank in fluidic connection with the vapor separator, and the vapor separator is located between a front end of the engine and the main fuel tank.

5. A small watercraft as in claim 1, wherein the engine includes a flywheel magneto located at the front end of the engine, and the vapor separator is at least partially positioned above the flywheel magneto.

6. A small watercraft as in claim 1, wherein the at least two air openings are located on opposite sides of the engine.

7. A small watercraft as in claim 1 additionally comprising an exhaust system which communicates with at least one exhaust port of the engine to expel exhaust gases outside the engine compartment, the exhaust system including a water trap positioned on a side of a longitudinal axis of the watercraft hull opposite of the side on which the vapor separator is located.

8. A small watercraft as in claim 7, wherein the vapor separator is mounted to a side wall of the hull.

9. A small watercraft as in claim 8, wherein at least one damper is positioned between the hull and the vapor separator.

10. A small watercraft as in claim 1, wherein the vapor separator includes a valve arranged to control fuel flow into an inlet port of the vapor separator and a float positioned within a tank of the vapor separator and arranged to operate said valve in order to maintain a predetermined fuel level within the tank.

11. A small watercraft as in claim 10, wherein said float rotates about a pivot shaft.

12. A small watercraft as in claim 11, wherein said pivot shaft is arranged within the vapor separator with an axis of the pivot shaft arranged generally transverse to a longitudinal axis of the hull.

13. A small watercraft as in claim 1, wherein the engine is disposed within the engine compartment at a location in the vicinity of the steering operator.

14. A small watercraft as in claim 1, wherein the engine is disposed within the engine compartment at a location generally beneath the longitudinally extending seat.

15. A personal watercraft comprising a hull defining a longitudinal axis and including an engine compartment, an internal combustion engine being positioned within the engine compartment and powering a propulsion device of the watercraft, a fuel supply system including a vapor separator and at least one charge former, the fuel supply system being configured to supply fuel from the vapor separator to the at least one charge former of the engine through a fuel supply line, an exhaust system configured to guide exhaust gases from the engine body to an exhaust discharge and including at least a first watertrap device arranged on a first side of the longitudinal axis, the vapor separator comprising a buoyant body rotatably mounted about a pivot axis, the pivot axis extending in a direction generally transverse to the longitudinal axis of the watercraft.

16. The watercraft according to claim 15 additionally comprising a pivot arm connecting the buoyant body to a pivot shaft which defines the pivot axis.

17. The watercraft according to claim 1, wherein the at least two air openings comprise first and second air ducts extending through the hull so as to guide air from the atmosphere surrounding the watercraft into the engine compartment.

18. The watercraft according to claim 1, wherein the vapor separator is arranged such that air flowing between the air openings cools a fuel in vapor separator.

19. The watercraft according to claim 1 additionally comprising a fuel tank, one of the air openings being positioned in the engine compartment between the fuel tank and the engine.

20. The watercraft according to claim 1, wherein one of the air openings is positioned in the engine compartment rearward from the engine.

21. The watercraft according to claim 1, wherein the fuel pump comprises a high-pressure fuel pump disposed completely within the vapor separator.

22. The watercraft according to claim 21 additionally comprising an electric motor driving the high-pressure fuel pump and disposed within the vapor separator.

23. The watercraft according to claim 1 additionally comprising an induction system having an inlet and being configured to guide induction air into the engine, the vapor separator positioned near the air flow into the inlet.

24. The watercraft according to claim 23, wherein the inlet of the induction system, comprises an intake air silencer.

25. The watercraft according to claim 1 additionally comprising a flywheel and a fuel tank positioned on the forward end of the engine, the vapor separator positioned between the fuel tank and the engine and above the flywheel.

26. A personal watercraft comprising a hull defining a longitudinal axis and including an engine compartment, a propulsion device supported by the hull, an internal combustion engine being positioned within the engine compartment and powering the propulsion device, a fuel supply system including a vapor separator and at least one charge former, the fuel supply system being configured to supply fuel from the vapor separator to the at least one charge former of the engine through a fuel supply line, an exhaust system configured to guide exhaust gases from the engine body to an exhaust discharge and including at least a first watertrap device arranged on a first side of the longitudinal axis, the vapor separator being positioned on a second side of the longitudinal axis, opposite the first side.

27. The watercraft according to claim 26, wherein the hull additionally comprises at least one side wall on the second side of a longitudinal axis, the vapor separator being mounted to the side wall.

28. The watercraft according to claim 27, wherein the vapor separator is positioned forward from the engine.

29. The watercraft according to claim 27, wherein the vapor separator is positioned rearward from the engine.

30. A small watercraft as in claim 26, wherein the engine is disposed within the engine compartment at a position in the vicinity of a steering operator.

31. A small watercraft as in claim 26, wherein the engine is disposed within the engine compartment at a position generally beneath a longitudinally extending seat.

32. A personal watercraft comprising a hull defining a longitudinal axis and including an engine compartment, a propulsion device supported by the hull, an internal combustion engine being positioned within the engine compartment and powering the propulsion device, a fuel supply system including a vapor separator and at least one charge former, the fuel supply system being configured to supply fuel from the vapor separator to the at least one charge former of the engine, an induction system configured to guide induction air into the engine, a breather conduit connecting the vapor separator with the induction system, and a check valve disposed in the breather conduit, the check valve being configured to prevent water from flowing into the breather conduit and toward the vapor separator.

33. The watercraft according to claim 32, wherein the check valve is configured to permit fuel to flow through the valve and into the induction passage.

34. The watercraft according to claim 32 additionally comprising an induction passage extending to the engine body and a reed valve assembly controlling a flow of induction air through the induction passage, the breather conduit being connected to the intake passage at a location near the reed valve assembly.

35. The watercraft according to claim 32 wherein the breather conduit is connected to an upper wall of the vapor separator.

36. The watercraft according to claim 32 additionally comprising a flywheel mounted at a forward end of the engine, the vapor separator being arranged above the flywheel.

37. The watercraft according to claim 36 additionally comprising a fuel tank supported by the hull and positioned forward from the engine, the vapor separator being positioned between the engine and the fuel tank.

38. The watercraft according to claim 32 additionally comprising a high-pressure fuel pump disposed within the vapor separator.

39. The watercraft according to claim 38 additionally, comprising an electric motor driving the high-pressure fuel pump.

40. The watercraft according to claim 39, wherein an electric motor is disposed within the vapor separator.

* * * * *